Jan. 13, 1953
L. FULLER
2,625,574
STORAGE BATTERY PLATE GRID
Filed Nov. 8, 1949
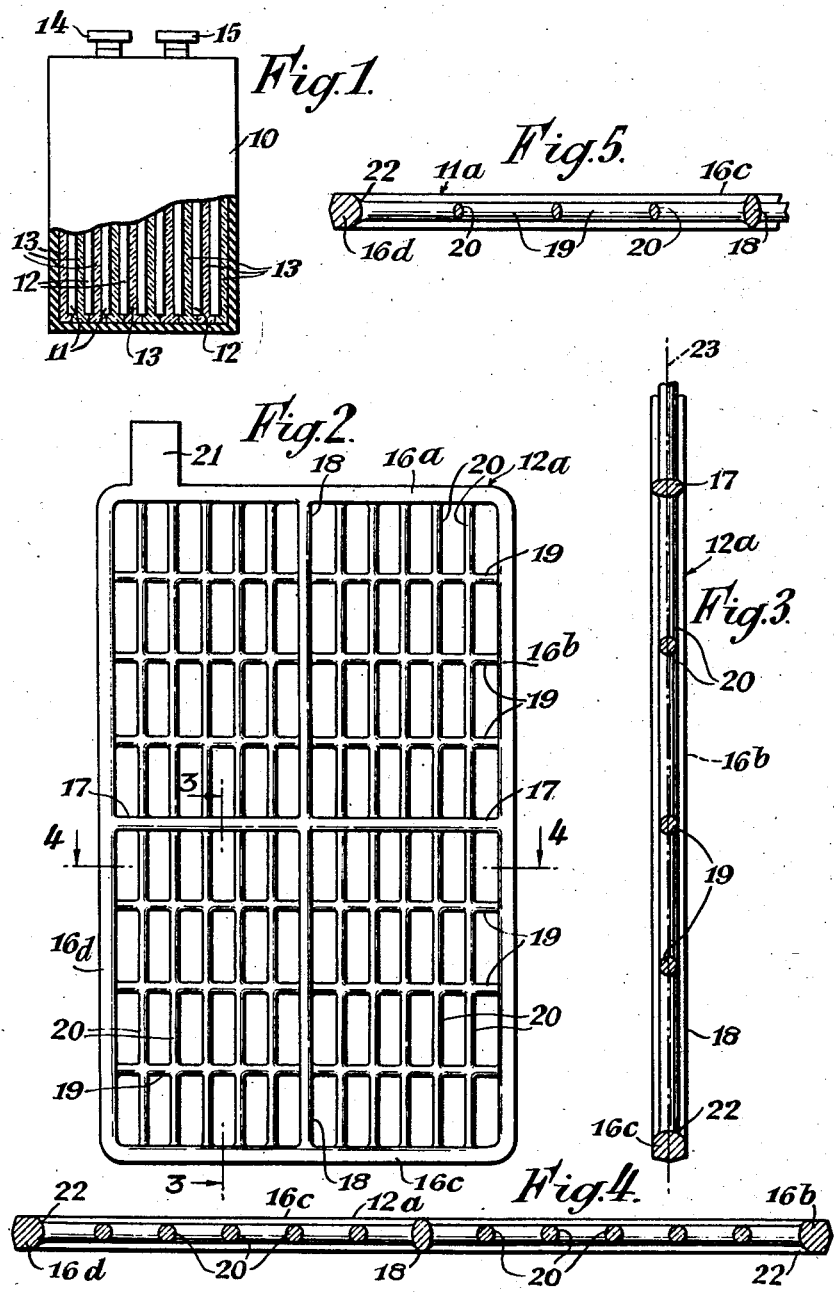
INVENTOR
*Leonard Fuller.*
BY
*Mason, Porter, Diller & Stewart*
ATTORNEYS Patented Jan. 13, 1953

2,625,574

UNITED STATES PATENT OFFICE 2,625,574

STORAGE BATTERY PLATE GRID

Leonard Fuller, London, England, assignor of one-half to Edmund William Sudlow, Leigh-on-Sea, England Application November 8, 1949, Serial No. 126,156
In Great Britain November 9, 1948

5 Claims. (Cl. 136—36)

This invention relates to lead-acid electric secondary or storage batteries of the type in which the electrodes are constituted by grids made of lead or lead alloy, the interstices of said grids being filled with paste which is treated to form the active material of the battery.

These lead or lead alloy grids which will be collectively referred to as lead grids are usually cast and comprise a relatively stout marginal frame between the members of which extend spaced, staggered, cross-members or grid bars, these being relatively thin and normally being triangular in section so as to key with the paste and at the same time reduce the area of exposed metal to a minimum. It is found, however, that when such plates are in service the thin grid bars of the plate grids corrode away after some time, with the result that the electrical conductivity between the grid and the active material is impaired; also the active material is no longer firmly supported, so that the plates disintegrate and the battery rapidly becomes ineffective.

It is the object of the invention to provide an improved form of metal plate grid which is found to have less liability to corrode and which, therefore, enables a more robust plate to be produced. The improved plates are especially advantageous when used in storage batteries of the so-called dry type, in which the whole of the space between the plates is occupied by porous separating material, which in conjunction with the plates, absorbs all the electrolyte required by the battery. In this type of battery the separating material presses firmly against the active material over its whole area and thus provides considerable support for the active material, so that an efficient keying engagement between the grid and the active material is by no means so essential as it is in a free-liquid battery.

According to the invention a pasted electrode plate for an electric secondary battery has a lead grid which is produced as a single casting and which comprises the following integral parts in combination, namely, a frame composed of four marginal bars arranged in a rectangle, and two sets of grid bars extending across the frame in intersecting relationship to form a lattice, the ends of the grid bars merging into the marginal bars, and the whole of said grid bars being of rounded shape in cross section and being disposed with their axes in a single plane, which single plane also contains the axes of the four marginal bars. The marginal bars may also be of rounded shape in cross section. Preferably each set of rigid bars include one or more main grid bars which are of increased thickness, measured at right angles to the said plane of the plate. Each main grid bar may advantageously have a thickness substantially equal to the thickness of the marginal bar. Conveniently the main grid bars are oval in cross section and the remaining grid bars are circular in cross section. Each marginal bar may have that surface which faces the grid bars curved to merge smoothly with the two side faces of the frame, in such a way as to avoid any sharp edges in contact with the paste within which the lattice of the grid is embedded.

There is further provided according to the invention a lead-acid electric secondary battery of the so-called dry type having a plurality of pasted lead grids assembled with interposed sheets of soft porous separating material which absorb the acid electrolyte and intimately support the paste over the whole area of both faces of each plate, characterised by the fact that the grids have grid bars which are of rounded shape in section so as to be devoid of sharp edges. Each lead grid may advantageously be produced as a single casting and comprise the following parts in combination, namely a frame composed of four marginal bars arranged in a rectangle, and two sets of grid bars extending across the frame in intersecting relationship to form a lattice, the ends of the grid bars merging into the marginal bars, and the whole of said grid bars being of rounded shape in cross section and being disposed with their axes in a single plane, which single plane also contains the axes of the four marginal bars.

It is believed that the presence of sharp edges on the grid causes intense local electrolytic action, which in due course starts corrosion nuclei. By making the grid bars of circular or other rounded shape in section, the electrolytic action is better distributed across the surface of the metal with the result that corrosion is substantially or indefinitely postponed. Although it is desirable that the thicker members of the grid (such as the outer frame and any thick cross reinforcing members that may be provided) should also be of rounded shape in section, this is not absolutely essential as these members contain a substantial thickness of metal and are therefore not easily weakened by corrosion on the surface. Those grid bars which are thinner than the frame are usually completely embedded in the active material, when this is pasted so as to be flush with the outer frame. The main grid bars may be flush with the frame to serve as supporting guides for the tool used in pasting.

The invention is illustrated by way of example in the accompanying diagrammatic drawings, in which:

Figure 1 is an end elevation of a typical electric secondary battery of the so-called dry type, shown partly in section;

Figure 2 is a side elevation of one of the lead alloy grids used for the positive plates, drawn to a much larger scale than Figure 1;

Figure 3 is a fragmentary sectional end elevation of the grid, taken on the line 3—3 of Figure 2, and drawn to an enlarged scale;

Figure 4 is an enlarged sectional plan of the grid taken on the line 4—4 of Figure 2; and Figure 5 is a fragmentary view, similar to Figure 4, but showing a lighter construction of grid which is suitable for the negative plates.

The secondary battery shown in Figure 1 comprises a box-like casing 10 of acid-proof material into which is fitted an electrode-separator assembly composed of alternate negative plates 11 interspaced by positive plates 12; a sheet of soft porous separating material is interposed between adjacent pairs of plates, and between the outside plates and the casing 10, the separators being shown at 13. The plates 11, 12 and separators 13 are a tight fit within the casing 10 and are assembled under pressure so as to ensure that they occupy the whole of the casing 10, thus avoiding free air spaces. The plates 10, 11 are of course connected to terminals 14, 15 in the usual manner.

Each of the positive plates 12 comprises a lead grid 12a of the form shown in Figures 2, 3 and 4, this being cast as a single piece in a mould, as is well known in the art. It is rectangular in form and is composed of the following integral parts, namely four marginal bars 16a, 16b, 16c and 16d; one main grid bar 17 extending transversely between the mid-points of the marginal bars 16b, 16d; one main grid bar 18 extending vertically between the mid-points of the marginal bars 16a, 16c; a series of spaced horizontal grid bars 19 extending between the marginal bars 16b, 16d; a similar series of spaced vertical grid bars 20 extending between the marginal bars 16a, 16c; and a connection lug 21. All these parts are disposed so as to lie in the general plane of the plate, that is to say the axes of all the bars 17, 18, 19 and 20 all lie in the plane defined by the axes of the marginal bars 16a-d, this plane being indicated by the broken line 23 in Figure 3. This greatly simplifies the casting of the grid and is no disadvantage in a battery of the so-called dry type as the efficient locking of the active material in the grid is of secondary importance; this is because the active material is firmly held in position by the pressure of the compressed separators 13, which by virtue of their soft elastic nature, apply a uniform resilient pressure to the whole surface of the active material, thus efficiently holding it against the grids.

The main grid bars 17 and 18 are of oval or elliptical shape in cross section, the length of the major axis (of the cross section) being equal to the thickness of the marginal bars 16a-d as will be seen in Figures 3 and 4. The grid bars 19 and 20 are also rounded in cross section but are smaller, and are conveniently circular; thus when the plate is filled with lead oxide paste to form the active material, the various grid bars 19 and 20 are completely embedded. The main grid bars 17 and 18 form convenient guides for the usual scraper or equivalent used in pasting, thus ensuring a uniform paste thickness across the whole area of the plate. It will be seen that, in order to avoid sharp edges (which would encourage corrosion) the inwardly facing surfaces of the marginal bars 16a-d are smoothly rounded in cross section, as indicated at 22. Also, where the various grid bars 17, 18, 19, 20 intersect one another, or meet the marginal bars 16a-d a very small radius is provided instead of having a sharp corner.

For the negative plates 11 a lighter construction of grid can be used, thus economising in lead and at the same time providing more space for the active material. A satisfactory design of grid is shown at 11a in Figure 5. The main grid bars 17, 18 are again oval in cross section but are narrower than those shown in Figures 3 and 4, although the major axis of the section is again equal to the thickness of the marginal bars, one of which is seen at 16d. The grid bars 20 are oval instead of round, and the transverse grid bars 19 are also of the same oval shape in section, although this does not appear in Figure 5. The grid bars 19, 20 are substantially thinner (measured along the major axis of the cross section) than the main grid bars 17, 18 and the marginal bars 16a-d, so that when pasted the grid bars 19, 20 are completely embedded.

It will be understood that the above details are only given by way of example and that various modifications may be made in the improved form of plate and grid to suit batteries of different sizes and types and the method of pasting. The grid bars may be arranged in various patterns and may extend obliquely if desired.

If desired two or more main bars 17 and/or two or more main bars 18 may be used, to suit various sizes and shapes of plate. It may be desirable to use the improved plates in storage batteries of the free-liquid type, although it is thought that the full adavntages of the invention can only be realised in storage batteries of the so-called dry type as above described.

Besides the advantages of having an extended life due to the absence of corrosion, and the economy in lead, the improved grids are simple to cast as the various bars are all disposed in the same plane, and their rounded shape enables them to leave the mould easily.

What I claim is:

1. For an electric secondary battery a pasted electrode plate having a lead grid which is produced as a single casting and which comprises the following integral parts in combination, namely, a frame composed of four marginal bars arranged in a rectangle, and two sets of grid bars extending across the frame in intersecting relationship to form a lattice, the ends of the grid bars merging through well rounded surfaces into the marginal bars, all of said grid bars being disposed with their axes in a single plane, which single plane also contains the axes of the four marginal bars, and each said grid bar presenting only well rounded surfaces externally so as to be devoid of any exposed sharp edge portions throughout all external surface portions thereof.

2. A pasted electrode plate according to claim 1 wherein the marginal bars also have well rounded inward corner portions and well rounded face portions extending toward the grid bars.

3. A pasted electrode plate according to claim 1, wherein each set of bars include one or more main grid bars which are of increased thickness, measured at right angles to the said plane of the plate, the main grid bars being oval in cross section throughout the full length thereof and the remaining grid bars being circular in cross section throughout the full length thereof.

4. A pasted electrode plate as defined in claim 1 wherein the grid includes one or more main grid bars which are oval in cross section with a thickness, measured at right angles to the said plane of the plate, substantially equal to the thickness of the marginal bars, the remaining grid bars being circular in cross section.

5. A pasted electrode plate as defined in claim 1 wherein the grid includes one or more main grid bars which are oval in cross section with a thickness, measured at right angles to the said plane of the plate, substantially equal to the thickness of the marginal bar, the remaining bars being circular in cross section and wherein of each marginal bar that surface which faces the grid bars is curved to merge smoothly with the two side faces of the frame, in such a way as to avoid any sharp edges in contact with the paste within which the lattice of the grid is embedded.

LEONARD FULLER.

REFERENCES CITED

The following references are of record in the file of this patent:

UNITED STATES PATENTS

| Number | Name | Date |
|---|---|---|
| 728,667 | Brocksmith | May 19, 1903 |
| 1,184,993 | Rabenalt | May 30, 1916 |
| 2,176,173 | Fuller et al. | Oct. 17, 1939 |
| 2,261,053 | Martis et al. | Oct. 28, 1941 |

FOREIGN PATENTS

| Number | Country | Date |
|---|---|---|
| 574,616 | Great Britain | Jan. 14, 1946 |